United States Patent
Murata et al.

(10) Patent No.: US 10,241,899 B2
(45) Date of Patent: Mar. 26, 2019

(54) TEST INPUT INFORMATION SEARCH DEVICE AND METHOD

(71) Applicant: HITACHI, LTD., Tokyo (JP)

(72) Inventors: Daijiro Murata, Tokyo (JP); Jun Maeoka, Tokyo (JP); Genta Koreki, Tokyo (JP); Kiyoshi Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 2 days.

(21) Appl. No.: 15/488,557

(22) Filed: Apr. 17, 2017

(65) Prior Publication Data

US 2018/0196738 A1    Jul. 12, 2018

(30) Foreign Application Priority Data

Jan. 12, 2017    (JP) ................................ 2017-003191

(51) Int. Cl.
     *G06F 11/36*      (2006.01)
     *G06F 17/30*      (2006.01)

(52) U.S. Cl.
     CPC .... *G06F 11/3684* (2013.01); *G06F 17/30952* (2013.01); *G06F 17/30979* (2013.01)

(58) Field of Classification Search
     CPC ........... G06F 11/3684; G06F 17/30952; G06F 17/30979
     USPC ........................................................ 717/124
     See application file for complete search history.

(56) References Cited

U.S. PATENT DOCUMENTS

| | | | | |
|---|---|---|---|---|
| 6,658,485 | B1* | 12/2003 | Baber ..................... | G06F 9/546 718/103 |
| 6,701,514 | B1* | 3/2004 | Haswell ............. | G06F 11/3664 717/124 |
| 7,490,319 | B2* | 2/2009 | Blackwell .......... | G06F 11/3664 717/124 |
| 7,676,794 | B2* | 3/2010 | Akiyama .................. | G06F 8/30 717/124 |

(Continued)

FOREIGN PATENT DOCUMENTS

| | | | |
|---|---|---|---|
| JP | 2012221311 A | * | 11/2012 |
| JP | 2013012162 A | * | 1/2013 |
| JP | 5523526 B2 | | 6/2014 |

OTHER PUBLICATIONS

Han et al., "Knowledge Discovery in Databases: An Attribute-Oriented Approach", 1992, Proceedings of the 18th VLDB Conference (Year: 1992).*

(Continued)

*Primary Examiner* — Wei Y Zhen
*Assistant Examiner* — Junchun Wu
(74) *Attorney, Agent, or Firm* — Volpe and Koenig, P.C.

(57) ABSTRACT

A test input information search device searches for a candidate for test inputting in a database, and stores information of the database including a plurality of elements configured with a first structure, stores screen information including the plurality of elements configured with a second structure and displayed, identifies, from the second structure, relation between the elements in the plurality of elements included in the screen information, and searches for, based on the identified relation between the elements, the plurality of elements as the candidate for the test inputting from the information of the database.

13 Claims, 14 Drawing Sheets

(56) References Cited

U.S. PATENT DOCUMENTS

| | | | | |
|---|---|---|---|---|
| 7,861,226 B1* | 12/2010 | Episkopos | ......... | G06F 11/3696 717/124 |
| 8,281,282 B2* | 10/2012 | Smith | ............... | G06F 17/30607 717/116 |
| 2003/0212984 A1* | 11/2003 | Miyazaki | ................ | G06F 8/75 717/116 |
| 2008/0109786 A1* | 5/2008 | Munechika | ........ | G06F 17/2247 717/112 |
| 2009/0300587 A1* | 12/2009 | Zheng | ................ | G06F 11/3676 717/127 |
| 2010/0211924 A1* | 8/2010 | Begel | ....................... | G06F 8/74 717/101 |
| 2011/0131002 A1* | 6/2011 | Sheye | ................ | G06F 11/3684 702/123 |
| 2012/0174073 A1* | 7/2012 | Rajopadhye | ........... | G06Q 10/06 717/126 |
| 2013/0031532 A1* | 1/2013 | Guinier | ............... | G06F 11/3688 717/127 |
| 2013/0262934 A1* | 10/2013 | Zhang | ................ | G06F 11/3684 714/38.1 |
| 2014/0173564 A1* | 6/2014 | Crawford | ............ | G06F 11/3676 717/124 |
| 2014/0229917 A1* | 8/2014 | Chiantera | ........... | G06F 11/3684 717/124 |
| 2015/0339213 A1* | 11/2015 | Lee | ..................... | G06F 11/3664 717/125 |
| 2017/0024311 A1* | 1/2017 | Andrejko | ............ | G06F 11/3672 |
| 2017/0199810 A1* | 7/2017 | Hamilton, II | ....... | G06F 11/3672 |

OTHER PUBLICATIONS

Last et al., "Information-theoretic algorithm for feature selection", 2001, Elsevier (Year: 2001).*

Pan et al., "Generating Program Inputs for Database Application Testing", 2011, IEEE (Year: 2011).*

Codd, "Extending the Database Relational Model to Capture More Meaning", Dec. 1979, ACM, vol. 4, No. 4, pp. 397-434 (Year: 1979).*

* cited by examiner

F I G. 2 A

1010

101001 101002 101003 101004 101005 101006 101007

| BUY_ID* | PAYM# | ACC# | LIMIT | CHARGE | SUMMARY | NOTE |
|---|---|---|---|---|---|---|
| BUY0001 | 1 | A101 | 2016/6/1 | 500 | 12500 | PLEASE BE CAREFUL ABOUT QUANTITY DIFFERENT FROM THAT OF LAST ORDER. |
| BUY0003 | 1 | A101 | 2016/6/3 | 500 | 10500 | PLEASE PROCEED. |

101051

101052

F I G. 2 B

1011

101101 101102 101103 101104 101105

| ITEM_ID* | BUY_ID# | PRD_ID# | PRICE | NUM |
|---|---|---|---|---|
| ITEM001 | BUY0001 | PRD101 | 10000 | 1 |
| ITEM002 | BUY0002 | PRD101 | 10000 | 1 |
| ITEM003 | BUY0001 | PRD102 | 2000 | 2 |
| ITEM004 | BUY0004 | PRD101 | 1500 | 1 |

| PRD_ID* | PRD_NAME |
|---|---|
| PRD101 | FAN A |
| PRD102 | TELESCOPE A |
| PRD103 | FAN B |
| PRD1201 | CHAIR Z |

| AC_ID* | AC_NAME |
|---|---|
| A101 | Taro Tanaka |
| A102 | Jiro Sato |
| A103 | John A. B. Smith |
| A998 | Ichiro Yamada |

| PAY_ID* | PAY_NAME |
|---|---|
| 1 | BANK TRANSFER |
| 2 | CARD |
| 3 | CASH |

```
                                                                1020
<a href="...">Taro Tanaka</a>THIS IS ORDER HISTORY OF MR/MS.
  <ul>           102000
    <li>2016/06/01</li>
    <ul>            102001
      <li>ORDER ID:BUY0001</li>
      <ul>                    102011
        <li>PURCHASE DETAILS</li>
          <table class="items">
            <tr class="item">  102021    102022
              <td class="product">FAN A</td>
                          102023    102024
              <td class="price">10000 YEN</td>
                          102025   102026
              <td class="num"> × 1</td>
            </tr>
            <tr class="item">  102031          102032
              <td class="product">TELESCOPE A</td>
                          102033    102034
              <td class="price">2000 YEN</td>
                          102035   102036
              <td class="num"> × 2</td>

</tr>
          </table>      102041                            102042
          <div class="charge">TRANSPORTATION FEE:500 YEN</div>
                          102043                  102044
          <div class="summary">TOTAL PRICE:12500 YEN</div>
                                                       102051
        <li>METHOD OF PAYMENT: BANK TRANSFER</li>
        <li>REMARKS: PLEASE BE CAREFUL ABOUT QUANTITY DIFFERENT
            FROM THAT OF LAST ORDER</li>  102061
```

F I G. 4

| TABLE NAME | TABLE TYPE | |
|---|---|---|
| BUY | TRANSACTION | ~151051 |
| PRD | MASTER | ~151052 |
| ACC | MASTER | ~151053 |
| PAY | MASTER | ~151054 |

|  | Taro Tanaka | 2016… | BUY0001 | 1 | FAN A | 10000 | 2 | TELESCOPE A | 2000 | 500 | 12500 | BANK TRANSFER | LAST… |
|---|---|---|---|---|---|---|---|---|---|---|---|---|---|
| Taro Tanaka |  |  |  |  |  |  |  |  |  |  |  |  |  |
| 2016… | R |  |  |  |  |  |  |  |  |  |  |  |  |
| BUY0001 | R | R |  |  |  |  |  |  |  |  |  |  |  |
| 1 | R | R | R |  |  |  |  |  |  |  |  |  |  |
| FAN A | R | R | R | R |  |  |  |  |  |  |  |  |  |
| 10000 | R | R | R | R | R |  |  |  |  |  |  |  |  |
| 2 | R | R | R | C | R | R |  |  |  |  |  |  |  |
| TELESCOPE A | R | R | R | R | C | R | R |  |  |  |  |  |  |
| 2000 | R | R | R | R | R | C | R | R |  |  |  |  |  |
| 500 | R | R | R | R | R | R | R | R | R |  |  |  |  |
| 12500 | R | R | R | R | R | R | R | R | R | R |  |  |  |
| BANK TRANSFER | R | R | R | R | R | R | R | R | R | R | R |  |  |
| LAST… | R | R | R | R | R | R | R | R | R | R | R | R |  |

FIG. 7

| CANDIDATE NUMBER (154001) | SCREEN ELEMENT (154002) | CORRESPONDING RECORD (154003) | CORRESPONDING COLUMN (154004) | 1540 |
|---|---|---|---|---|
| 1 | PLEASE BE CAREFUL ABOUT QUANTITY DIFFERENT FROM THAT OF LAST ORDER. | BUY.BUY_ID="BUY0001" | BUY.NOTE | 154051 |
| 1 | BUY0001 | BUY.BUY_ID="BUY0001" | BUY.BUY_ID | 154052 |
| 1 | 1 | BUY.BUY_ID="BUY0001" | BUY.PAYM | 154053 |
| 1 | A101 | BUY.BUY_ID="BUY0001" | BUY.ACC | 154054 |
| 1 | 2016/6/1 | BUY.BUY_ID="BUY0001" | BUY.LIMIT | 154055 |
| 1 | 500 | BUY.BUY_ID="BUY0001" | BUY.CHARGE | 154056 |
| 1 | 12500 | BUY.BUY_ID="BUY0001" | BUY.SUMMARY | 154057 |
| 1 | 10000 | ITEM.ITEM_ID="ITEM001" | ITEM.PRICE | 154071 |
| 1 | 1 | ITEM.ITEM_ID="ITEM001" | ITEM.NUM | 154072 |
| 1 | 2000 | ITEM.ITEM_ID="ITEM003" | ITEM.PRICE | 154073 |
| 1 | 2 | ITEM.ITEM_ID="ITEM003" | ITEM.NUM | 154074 |
| 1 | BANK TRANSFER | PAY.PAY_ID="1" | PAY.PAY_NAME | 154091 |
| 1 | Taro Tanaka | ACC.AC_ID="A101" | ACC.AC_NAME | 154092 |
| 1 | FAN A | PRD.PRD_ID="PRD101" | PRD.PRD_NAME | 154093 |
| 1 | TELESCOPE A | PRD.PRD_ID="PRD102" | PRD.PRD_NAME | 154094 |
| 2 | ... | ... | ... | |

FIG. 8

| CONDITION INFORMATION (155001) | SCREEN ELEMENT (155002) | 1550 |
|---|---|---|
| MAXIMUM CHARACTER LENGTH | Taro Tanaka | 155051 |

FIG. 9

| 156001 | 156002 | 156003 | 156004 | 156005 | 156006 |
|---|---|---|---|---|---|
| CANDIDATE NUMBER | SCREEN ELEMENT | CONDITION INFORMATION | CORRESPONDING RECORD | CORRESPONDING COLUMN | CORRESPONDING VALUE |
| 1 | Taro Tanaka | MAXIMUM CHARACTER LENGTH | ACC.AC_ID="A101" | ACC.AC_NAME | John A. B. Smith |

ORDER HISTORY OF MR. Taro Tanaka

THIS IS ORDER HISTORY OF MR. Taro Tanaka  
141002  141001

☐ 2016/6/1  
141003

☐ ORDER ID:   BUY0001

• PURCHASE DETAILS 141010  141011  141012

| FAN A | 10000 YEN × 1 |

| TELESCOPE A | 2000 YEN × 2 |

141020  141021  141022  
141030

TRANSPORTATION FEE   500 YEN

TOTAL PRICE   12500 YEN  
141040  141031

• METHOD OF PAYMENT: BANK TRANSFER

• REMARKS: PLEASE BE CAREFUL ABOUT QUANTITY DIFFERENT FROM THAT OF LAST ORDER.  
141041

FIG. 11

TEST INPUT INFORMATION SEARCH

THESE ARE CANDIDATE DATABASE RECORDS
AS BASIS FOR SCREEN OUTPUT

■ CANDIDATE 1:

| SCREEN ELEMENT | CORRESPONDING RECORD | CORRESPONDING COLUMN | |
|---|---|---|---|
| LAST··· | BUY.BUY_ID="BUY0001" | BUY.NOTE | 142051 |
| BUY0001 | BUY.BUY_ID="BUY0001" | BUY.BUY_ID | 142052 |
| 1 | BUY.BUY_ID="BUY0001" | BUY.PAYM | 142053 |
| A101 | BUY.BUY_ID="BUY0001" | BUY.ACC | 142054 |
| 2016/6/1 | BUY.BUY_ID="BUY0001" | BUY.LIMIT | 142055 |
| 500 | BUY.BUY_ID="BUY0001" | BUY.CHARGE | 142056 |
| 12500 | BUY.BUY_ID="BUY0001" | BUY.SUMMARY | 142057 |
| 10000 | ITEM.ITEM_ID="ITEM001" | ITEM.PRICE | 142058 |
| 1 | ITEM.ITEM_ID="ITEM001" | ITEM.NUM | 142059 |
| 2000 | ITEM.ITEM_ID="ITEM003" | ITEM.PRICE | 142060 |
| 2 | ITEM.ITEM_ID="ITEM003" | ITEM.NUM | 142061 |
| BANK TRANSFER | PAY.PAY_ID="1" | PAY.PAY_NAME | 142062 |
| Taro Tanaka | ACC.AC_ID="A101" | ACC.AC_NAME | 142063 |
| FAN A | PRD.PRD_ID="PRD101" | PRD.PRD_NAME | 142064 |
| TELESCOPE A | PRD.PRD_ID="PRD102" | PRD.PRD_NAME | 142065 |

VALUES SATISFYING CONDITION

| Taro Tanaka | MAXIMUM CHARACTER LENGTH | John A. B. Smith |
|---|---|---|

■ CANDIDATE 2:

F I G. 1 5
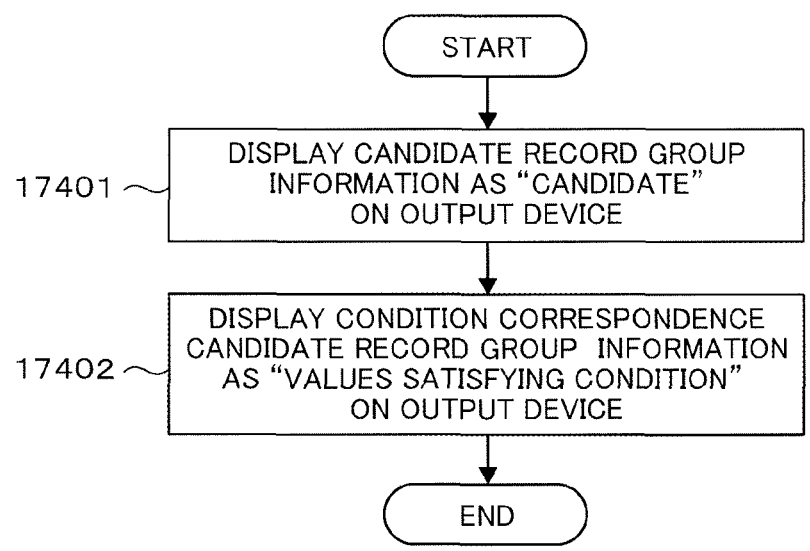

TEST INPUT INFORMATION SEARCH DEVICE AND METHOD

CLAIM OF PRIORITY

The present application claims priority from Japanese application JP 2017-003191 filed on Jan. 12, 2017, the content of which is hereby incorporated by reference into this application.

BACKGROUND OF THE INVENTION

The present invention relates to a test input information search device and method.

In program development of a large-sized computer system having a screen and a database, a test is required for confirming, through developer's screen operation, that the computer system satisfies a request of a person using the computer system. Upon test execution, the developer who executes the test inputs values such as character strings and numerical values in entry fields on the screen and clicks, for example, buttons and links on the screen to operate the computer system.

Upon the inputting of the character strings and the numerical values, inputting in accordance with an object of the test is performed and it is checked whether or not the computer system operates as expected. For example, in such a computer system in which a character string is inputted and a list of addresses including the aforementioned character string is displayed, to test whether or not over a given number of addresses can be displayed on the screen, the developer is required to input the character string included in the given number of addresses. Alternatively, to conform whether or not an error message is displayed when there is no corresponding address, the developer is required to input a character string not included in any of the addresses.

To makes it possible to manage and reproduce information upon the test, the developer is required to clearly write input values used for the test in a test scenario serving as a document which expresses a flow of the test. Further, the developer is also required to store information, which is to be confirmed and which is in accordance with the object, in the database used upon the test. In the example described above, the given number of addresses having the same character string are present in the database, and only addresses of another specific character string should not be present. That is, the developer is required to achieve consistency between the screen input values and the database.

On the one hand it takes great man-hour for the developer to crease, for the test, database records to be used in the test from the beginning. Thus, the developer acquires database records used in the computer system practically on operation, and masks customer information for use or continuously uses database records, which have been used since early times, through repeated modification thereof.

On the other hand the developer who creates a scenario of a test for screen operation is familiar with screen specifications and requirements of operations to be satisfied by the screen but is not necessarily familiar with the database. In a case where the database records are not created from the beginning, it is required to understand and investigate a design of the existing database and the records of the existing database, which is time-consuming. Thus, a mechanism is required which is provided for permitting even a developer who is not familiar with the database to create test inputs which are consistent with values of the database.

In association with such a test, Japanese Patent No. 5523526 discloses a technology of generating a test case from design information expressing a logic of a source code and creating a database record based on a restriction formula generated from the test case. More specifically, a technology has been disclosed which generates a test case from design information expressing a logic of a code and creates a database record based on a restriction formula generated from the test case.

SUMMARY OF THE INVENTION

With the technology disclosed in Japanese Patent No. 5523526, the design information for the database record creation is required. However, it requires great man-hour to generate the design information in a case where the developer is not familiar with a program structure, in a case where there is no source code, in a case where a source code is configured from a plurality of programming languages, or in a case where a scale of a source code is large and complicated, which makes it difficult to generate the design information.

On the contrary, without generating the design information and a new database record, by using the existing database records and screen information related to the aforementioned database, it is possible to find out, from the database, an element as an input value consistent with the database.

It is an object of the present invention to search for an element consistent with a data base record as a test input candidate for the purpose of supporting efficient creation of a test input value in test scenario creation of a calculator system having a database and a screen.

A test input information search device according to the present invention searches for a candidate for test inputting in a database, and stores information of the database including a plurality of elements configured with a first structure, stores screen information including the plurality of elements configured with a second structure and displayed, identifies, from the second structure, relation between the elements in the plurality of elements included in the screen information, and searches for, based on the identified relation between the elements, the plurality of elements as the candidate for the test inputting from the information of the database.

With one aspect of the present invention, it is possible to search for an element consistent with a database record as a test input candidate for the purpose of supporting efficient creation of a test input value in test scenario creation of a calculator system having a database and a screen.

BRIEF DESCRIPTION OF DRAWINGS

FIG. 2A is a diagram illustrating an example of a table "BUY".

FIG. 2B is a diagram illustrating an example of a table "ITEM".

FIG. 2C is a diagram illustrating an example of a table "PRD".

FIG. 2D is a diagram illustrating an example of a table "ACC".

FIG. 2E is a diagram illustrating an example of a table "PAY".

FIG. 3 is a diagram illustrating an example of screen information.

FIG. 4 is a diagram illustrating an example of table type information.

FIG. 6 is a diagram illustrating an example of search graph information.

FIG. 7 is a diagram illustrating an example of candidate record group information.

FIG. 8 is a diagram illustrating an example of test scenario condition information.

FIG. 9 is a diagram illustrating an example of condition correspondence candidate record group information.

FIG. 10 is a diagram illustrating an example of a first screen of an output device.

FIG. 11 is a diagram illustrating an example of a second screen of the output device.

FIG. 15 is a flowchart illustrating an example of processing performed by a result output processing unit.

DESCRIPTION OF THE EMBODIMENTS

Hereinafter, an embodiment for carrying out the present invention will be described with reference to FIGS. 1 to 15. In the present embodiment, for example, there is a test input information search device supporting efficient creation of a screen input value consistent with a database record upon creation of a test scenario of an information system having a database and a screen, or a test input information search method executed on a computer.

Figure 1:
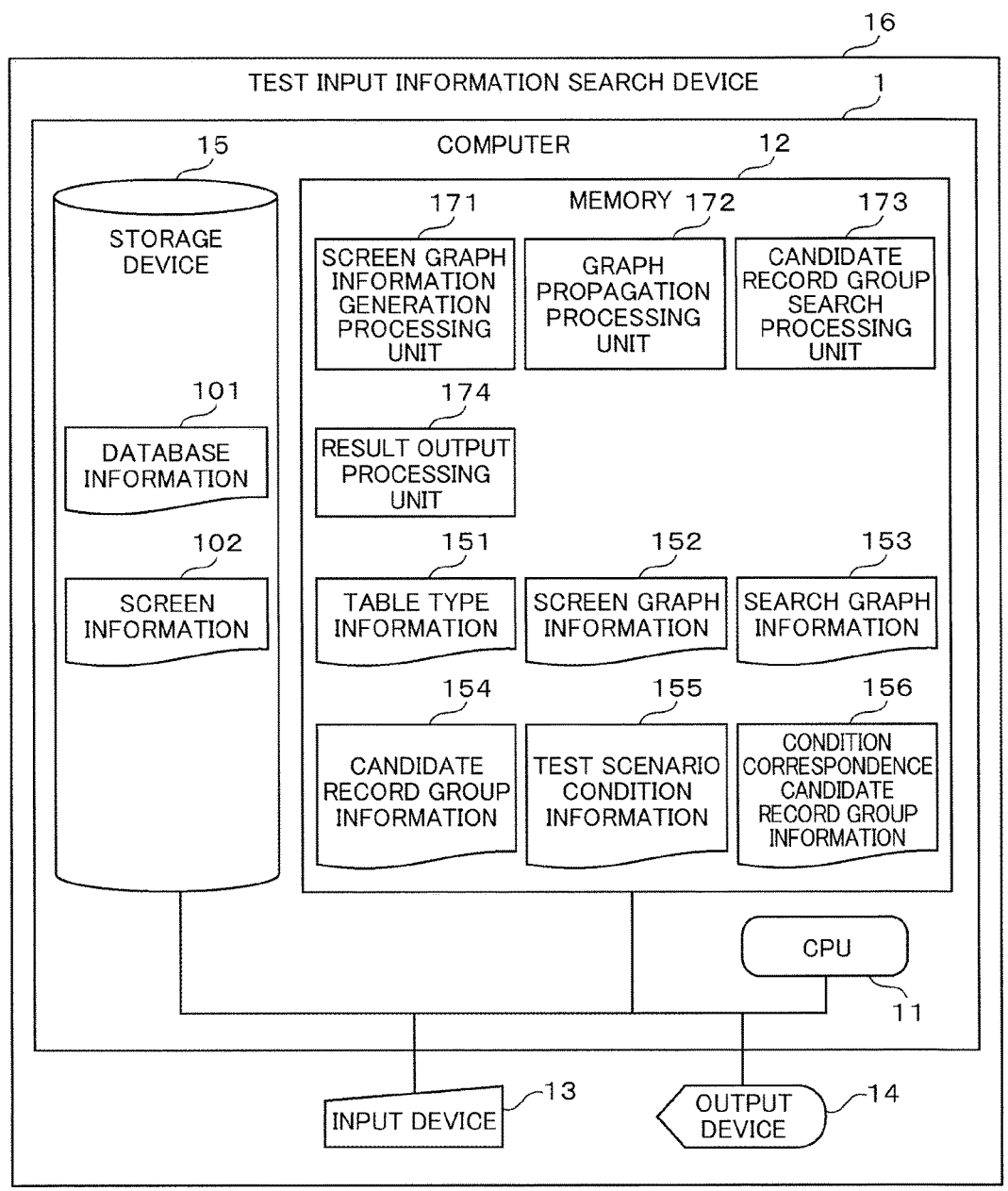
FIG. 1 is a diagram illustrating an example of a test input information search device.

FIG. 1 is a diagram illustrating an example of a test input information search device. A computer 1 illustrated in FIG. 1 forms a test input information search device 16 for supporting efficient creation of a screen input value consistent with a database record upon creation of a test scenario of an information system, not illustrated, having a database and a screen.

Hereinafter, a configuration example of the computer 1 will be described. The computer 1 has a CPU 11 and a memory 12. The CPU 11 and the memory 12 are connected to an input device 13 and an output device 14. The CPU 11 and the memory 12 are also connected to a storage device 15.

The storage device 15 holds: database information 101 which is used by an information system to be tested; and screen information 102 of the information system to be tested. Note that the storage device 15 is placed inside of the computer 1 in the example of FIG. 1 but may be placed outside of the computer 1, or may not be placed inside of the test input information search device 16 and may be connected to the information system to be tested to directly obtain the database information 101 and the screen information 102.

Further, the memory 12 holds table type information 151, screen graph information 152, search graph information 153, candidate record group information 154, test scenario condition information 155, condition correspondence candidate record group information 156, a screen graph information generation processing unit 171, a graph propagation processing unit 172, a candidate record group search processing unit 173, and a result output processing unit 174. Here, the various units held in the memory 12 may be programs, and the programs respectively corresponding to the various units may be executed by the CPU 11 to thereby provide the various units as hardware.

The database information 101 held in the storage device 15 is information indicating a record used in an information system targeted for test scenario creation. The screen information 102 is information illustrating a screen used in the information system targeted for the test scenario creation. The aforementioned pieces of information will be further described later on with reference to FIGS. 2 and 3.

The table type information 151 held in the memory 12 is information indicating a type of a table included in the database information 101. The screen graph information 152 is information indicating an element included in the screen information 102 and information related thereto. The search graph information 153 is information for searching for a candidate record group corresponding to the screen based on the database information 101.

The record group information 154 is information holding the candidate record group corresponding to the screen. The test scenario condition information 155 is information holding condition for indicating a record group satisfying specific test condition by use of the record group information 154. The condition correspondence candidate record group information 156 is information holding a candidate record group corresponding to the screen and the condition.

The screen graph information generation processing unit 171 is provided for reading in the screen information 102, adding inter-element relation (edge) to an element of the screen information 102, and outputting the screen graph information 152. The graph propagation processing unit 172 reads in the screen graph information 152, adds the inter-element relation of the screen graph information 152, and outputs the search graph information 153.

The candidate record group search processing unit 173 is one of features of the present embodiment. The candidate record group search processing unit 173 reads in the database information 101, the table type information 151, and the search graph information 153, performs search based on order of priority given thereto, and outputs the candidate record group information 154 and the condition correspondence candidate record group information 156.

Based on the above, graph information for use in the search can be created based on a value of an element displayed on the screen, a type of the element, and the inter-element relation, and a candidate database record serving as a basis of the value of the element displayed on the screen can be searched for and displayed on an output device. Further, condition of the test scenario to be created can be accepted and a database record conforming the condition can be displayed on the screen. Therefore, designing of a database used by the information to be tested and test scenario creation operation by a developer who is not familiar with database records and programs can easily be performed.

The result output processing unit 174 reads in the candidate record group information 154 and the condition correspondence candidate record group information 156 and displays the aforementioned information at the output device 14.

FIGS. 2A to 2E are diagrams illustrating examples of the database information 101. Tables 1010 to 1014 illustrated in FIGS. 2A to 2E hold records used in the information system targeted for the test scenario creation. Hereinafter, the table 1010 illustrated in FIG. 2A has a table name "BUY" and defined as a table which holds the records expressing information identified by a term "Order information". Moreover, the table 1011 illustrated in FIG. 2B has a table name "ITEM" and is defined as a table which holds the records expressing information identified by a term "Order details information".

Moreover, the table 1012 illustrated in FIG. 2C has a table name "PRD" and is defined as a table which holds the records expressing information identified by a term "Product information". Moreover, the table 1013 illustrated in FIG. 2D has a table name "ACC" and is defined as a table which holds the records expressing information identified by a term "Contact person information". The table 1014 illustrated in FIG. 2E has a table name "PAY and is defined as a table which holds the records expressing information identified by a term "Payment information".

Hereinafter, columns and the records of the respective tables will be described. The table 1010 illustrated in FIG. 2A has, as the columns, BUY_ID101001, PAYM101002, ACC101003, LIMIT101004, CHARGE101005, SUMMARY101006, and NOTE101007, Of the aforementioned columns, the BUY_ID101001 is a primary key, the PAYM101002 is a foreign key which refers to PAY_ID101401 of the table 1014, and the ACC101003 is a foreign key which refers to AC_ID101301 of the table 1013. In the column names of the tables illustrated in FIG. 2A to 2E, a symbol "*" represents a primary key and a symbol "#" represents a foreign key. Hereinafter, for the primary key, a value of the column serving as the primary key of the record having a given value is called "primary key value". For example, a primary key value of a value "Please be careful about quantity different from that of last order" of the column 101007 is a value "BUY0001" of the column 101001.

The table 1010 has a record 101051 and a record 101052. The record 101051 indicates that, in a record in which a value of the BUY_ID101001 is "BUY0001", a value of the PAYM101002 is "1", a value of the ACC101003 is "A101", a value of the LIMIT101004 is "2016/6/1", a value of the CHARGE101005 is "500", a value of the SUMMARY101006 is "12500", and a value of the NOTE1101007 is "Please be careful about quantity different from that of last order".

The record 101052 also has values illustrated in FIG. 2A for the respective columns. Records of the table 1010 are not limited to the record 101051 and the record 101052, and may further include another record. The aforementioned another record in FIG. 2A is expressed by broken lines, which are also used to express the same in FIGS. 2B to 2D.

The table 1011 illustrated in FIG. 2B has, as columns, ITEM_ID101101, BUY_ID101102, PRD_ID101103, PRICE101104, and NUM101105. Of the aforementioned columns, the ITEM_ID101101 is a primary key, the BUY_ID101102 is a foreign key which refers to the BUY_ID101001 of the table 1010, and the PRD_ID101103 is a foreign key which refers to PRD_ID101201 of the table 1012. Moreover, the table 1011 has records 101151 to 101154.

The table 1012 illustrated in FIG. 2C has, as the columns, PRD_ID101201 and RPD_NAME101202. Of the aforementioned columns, the RPD_ID101201 is a primary key. Moreover, the table 1012 has records 101251 to 101254.

The table 1013 illustrated in FIG. 2D has, as columns, AC_ID101301 and AC_NAME101302. Of the aforementioned columns, the AC_ID101301 is a primary key. Moreover, the table 1013 has records 101351 to 101354.

The table 1014 illustrated in FIG. 2E has, as columns, PAY_ID101401 and PAY_NAME101402. Of the aforementioned columns, the PAY_ID101401 has a primary key. Moreover, the table 1014 has records 101451 to 101453.

FIG. 3 is a diagram illustrating an example of the screen information 102. An example of a display by the output device 14 corresponding to information 1020 of the screen information 102 illustrated in FIG. 3 will be described later on with reference to FIG. 10. The screen information 102 in the example of FIG. 3 adopts a hypertext markup language format (HTML) composed of tags as instructions related to display of elements on the screen (screen element); tag attributes(classes), and character strings. The information in the HTML format also includes information of a display position of each element. The character string 102000 is a character string "Taro Tanaka". The character strings and values displayed on the screen as described above are screen elements.

The tag 102001 is an instruction for displaying, on the screen of the output device 14, "2016/06/01" as a list item. The tag 102022 is an instruction for providing "Fan A" as a cell of the table, and has an attribute 10202, that is, an attribute "product". The tags 102024, 102026, 102032, 102034, and 102036 are also similarly instructions for provision as cells of the table, and similarly respectively have attributes 102023, 102025, 102031, 102033, and 102035.

The tag 102042 is an instruction for displaying, on the screen of the output device 14, a character string "Transportation fee: 500 yen" and has an attribute 102041, that is, an attribute "Charge". The tag 102044 is also an instruction for displaying and has an attribute 102043. The tag 102051 is an instruction for outputting a character string "Method of Payment: Bank transfer" as a list item on the screen of the output device 14, and the tag 102061 is also an instruction for outputting. Note that the information 1020 of the screen information 102 is expressed in the HTML format in FIG. 3, but the information 1020 may be in another format having inter-element relation (for example, display positional relationship between the screen elements) as information.

FIG. 4 is a diagram illustrating an example of the table type information 151. A table 1510 of the table type information 151 has a table name 151001 and a table type 151002 as columns. The table name 151001 is the column including table names of the tables 1010 to 1014 of the database information 101.

The table type 151002 has either of "Master" or "Transaction" for each of the tables illustrated in the table name 151001, where the "Master" is used as a read-only register and usually not changed in processing for operation realized by the information system and the "Transaction" is created by operation such as transaction in the processing for the operation realized by the information system and also saves accumulated transaction information.

The table 1510 in the example of FIG. 4 has records 151051 to 151054. Then the record 151051 indicates that the table type 151002 is "Transaction" in the record where the table name 151001 is "BUY". That is, it indicates that the record "Order information" held by the table 1010 whose table name is "BUY" is transaction information.

The records 151052 to 151054 also indicate that the table names "PRD", "ACC", and "PAY" are each "Master". Note that the table 1510 may further have another record, omission of which is expressed by wavy lines in FIG. 4.

Figure 5:
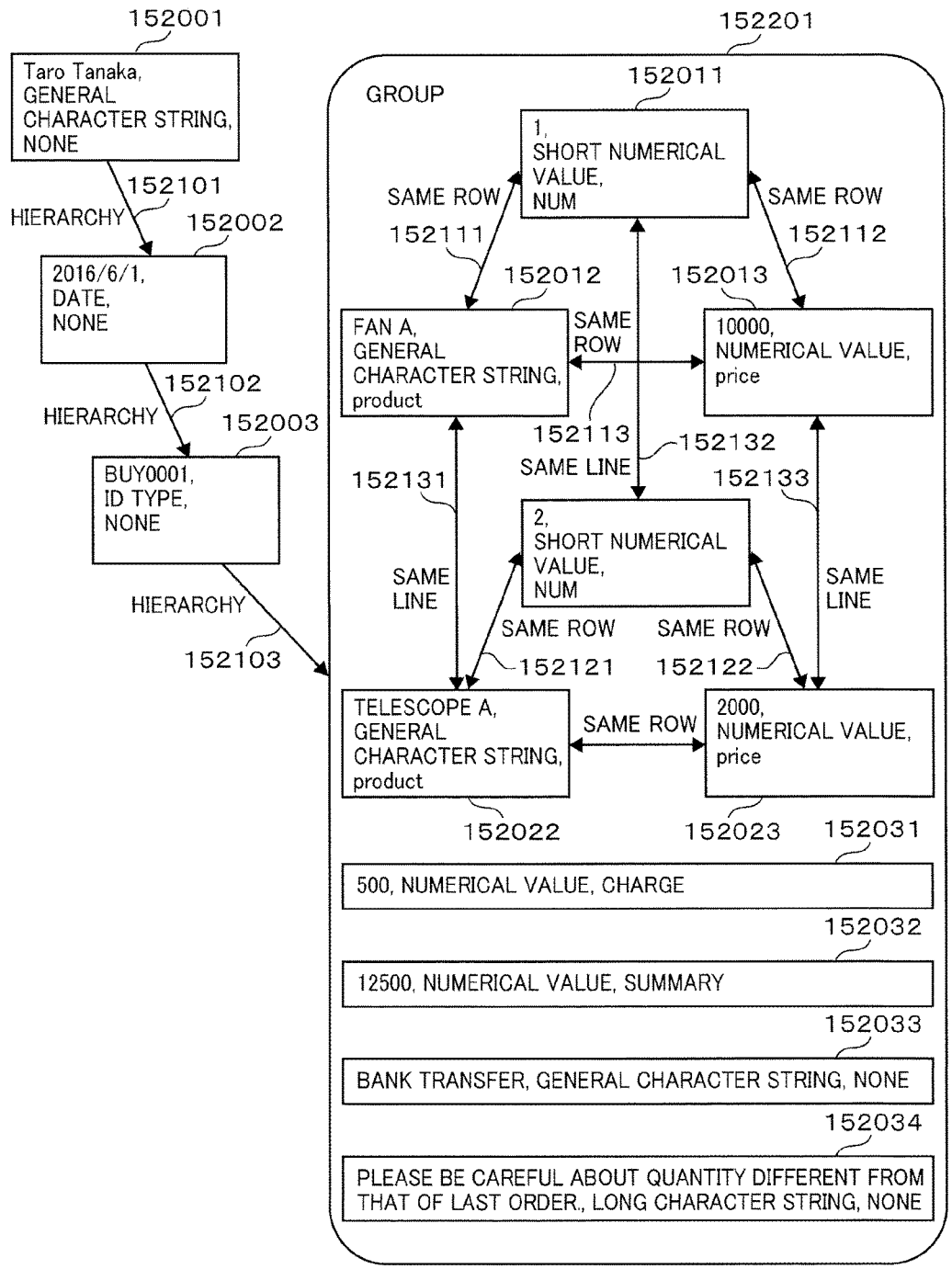
FIG. 5 is a diagram illustrating an example of screen graph information.
Figure 12:
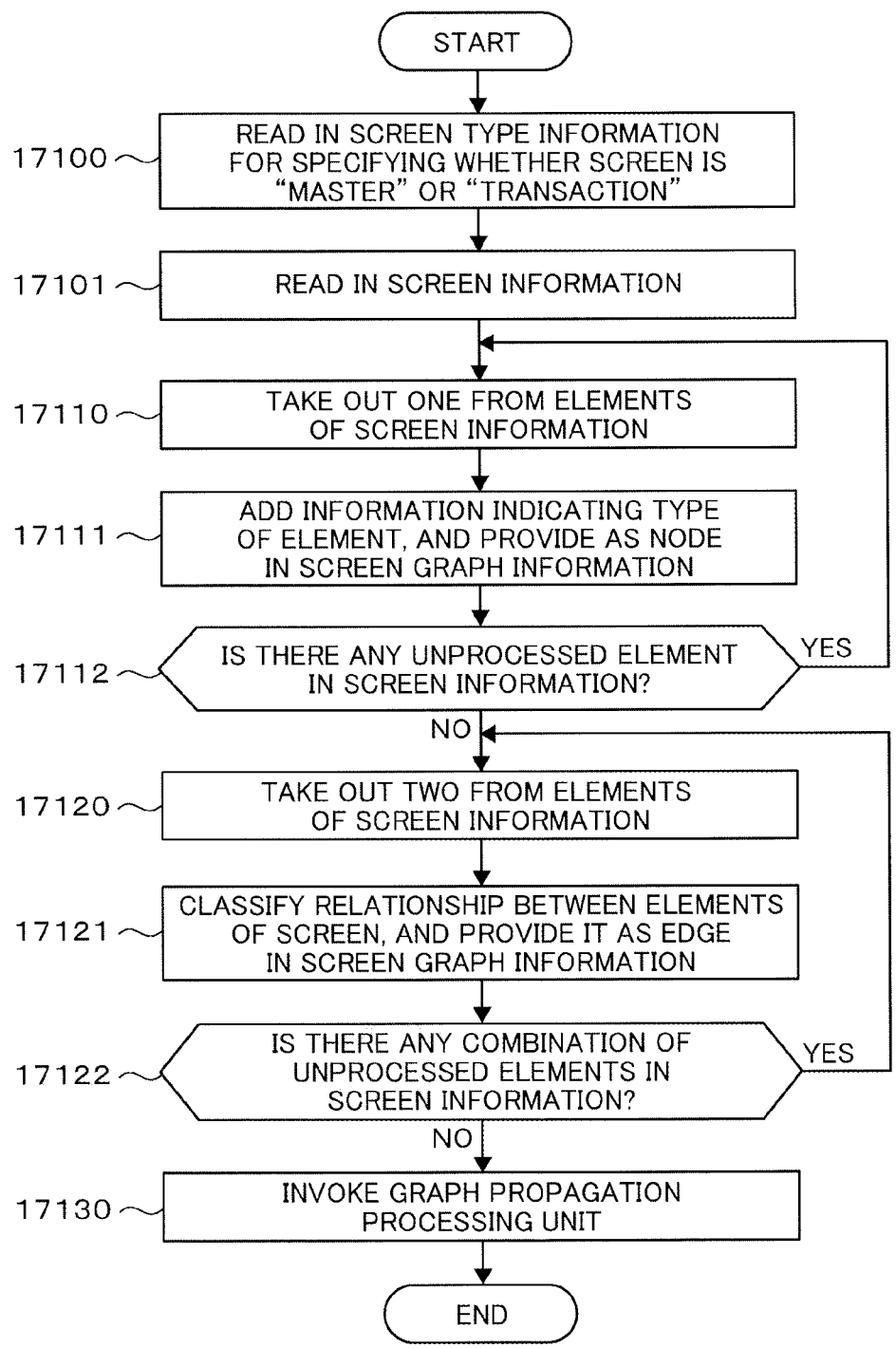
FIG. 12 is a flowchart illustrating an example of processing performed by a screen graph information generation processing unit.

FIG. 5 is a diagram illustrating an example of the screen graph information 152. The screen graph information 152 is composed of: nodes 152001 to 152003, nodes 152011 to 152013, nodes 152021 to 152023, nodes 152031 to 152034, edges 152101 to 152103, edges 152111 to 152113, edges 152121 to 152123, edges 152131 to 152133, and a group 152201.

The group 152201 in the example of FIG. 5 is an expression indicating that the edge 152103 is related from the node 152003 to each of the nodes in the group 152201. More specifically, the edge 152103 is related to the nodes 152011 to 152013, the nodes 152021 to 152023, and the nodes 152031 to 152034.

The node 152001 indicates that a type of the character string 102000 illustrated in FIG. 3, that is, "Taro Tanaka" is expressed by "General character string" and "None". Moreover, the edge 152101 "Hierarchy" indicates that there is relation between the nodes 152001 and 152002 where the node 152001 is a parent. Relation ("Hierarchy", "Same row", or "Same line") between the nodes (screen elements) indicated by the edge is display positional relation included in the information in the HTML format illustrated in FIG. 3, that is, display positional relation illustrated in FIG. 10.

The character strings such as "Taro Tanaka" in the example of FIG. 5 is defined as a node identifier, but each element of the information 1020 of the screen information 102 may be assigned with an ID (screen element ID), which may be used as a node identifier. Especially in a case where a plurality of elements have the same character string, it is effective in node identification to assign different screen element IDs to the aforementioned elements.

FIG. 6 is a diagram illustrating an example of the search graph information 153. Lines 153001 to 153013 and rows 153051 to 153063 in the table 1530 of the search graph information 153 respectively represent values of the nodes (the character strings) in the screen graph information 152 illustrated in FIG. 5, and each of cells in a frame 153070 represents relation between the nodes.

Hereinafter, a description will be given under the assumption that information included in the table 1530 of the search graph information 153 illustrated in FIG. 6 represents the nodes illustrated in FIG. 5 by the character strings of the lines 153001 to 153013 and the rows 152051 to 153063 and that the cells of the frame 153070 is graph information expressing the edges illustrated in FIG. 5. Moreover, the description will be given under the assumption that the nodes of the lines 153001 to 153013 and the rows 152051 to 153063 have, in addition to the character strings illustrated in FIG. 6, the type information illustrated in FIG. 5.

"2016 . . . " of the row 153052 and the line 153002 illustrated in FIG. 6 represents the node 152002 "2016/6/1" illustrated in FIG. 5, and "last . . . " of the row 153063 and the line 153013 illustrated in FIG. 6 represents the node 152034 "Please be careful about quantity different from that of last order" illustrated in FIG. 5.

In each of the cells of the frame 153070, "R" indicates that a value (character string) of the line or a primary key value of the value of the line and a value (character string) of the row or a primary key value of the value of the row can be in the same record, and "C" indicates that the value of the line and the value of the row can be in the same column. For example, the cell 153071 has a value "R", and thus indicates relation that the same record can be present between the line 153001 corresponding to the character string "Taro Tanaka" in the node 152001 "Taro Tanaka, general character string, none" and the character string "Bank transfer" in the node 152033 "Bank transfer, general character string, none". On the table 1010 of FIG. 2A, the primary key value "A101" of the value "Taro Tanaka" in the record 101351 and the column 101302 of the table 1013 of FIG. 2D and the primary key value "1" of the value "Bank transfer" in the record 101451 and the column 101402 of the table 1014 of FIG. 2E are in the same record 101051. Therefore, the relation indicated by "R" is established.

The cell 153072 has a value "C", and thus indicates that a character string (value) "1" in the node 152011 "1, short numerical value, num" and a character string (value) "2" in the node 152021 "2, short numerical value, num" have relation such that they can be in the same column. Note that, if there is no relation, values are "x" in the cells of the frame 153070, which is not the case in the example of FIG. 6.

FIG. 7 is a diagram illustrating an example of the candidate record group information 154. A table 1540 of the candidate record group information 154 has, as columns, a candidate number 154001, a screen element 154002, a corresponding record 154003, and a corresponding column 154004. The table 1540 also has records 154051 to 154057, records 154071 to 154074, and records 154091 to 154094. Note that the table 1540 may further have another record, for example, the candidate number 154001 may have a record "2" and omission of another record is indicated by wavy lines in FIG. 7.

The record 154051 is a record in which the candidate number 154001 is "1" and the screen element 154002 is "Please be careful about quantity different from that of last order", and the corresponding record 154003 in the record 154051 is "BUY. BUY_ID="BUY0001"" and the corresponding column 154004 indicates "BUY. NOTE".

As a result, the corresponding record 154003 "BUY. BUY_ID="BUY0001"" indicates a record in which a column "BUY_ID" of the table 1010 whose table name is "BUY" is "BUY0001", that is, the record 101051 illustrated in FIG. 2. Then the corresponding column 154004 "BUY. NOTE" indicates a column "NOTE" of the table 1010 whose table name is "BUY", that is, the NOTE 101007 of the table 1010 of FIG. 2.

Summarizing the above, the record 154051 indicates that the screen element 145002 "Please be careful about quantity different from that of last order." in a candidate whose candidate number 154001 is "1" has, as original information, the NOTE101007 "Please be careful about quantity different from that of last order." of the record 101051 of the table 1010 of FIG. 2. Then a character string 141041 to be illustrated in FIG. 10 later on has, as original information, the screen element 154002 "Please be careful about quantity different from that of last order." illustrated in FIG. 7.

FIG. 8 is a diagram illustrating an example of the test scenario condition information 155. A table 1550 of the test scenario condition information 155 has, as columns, condition information 155001 and a screen element 155002. The table 1550 also has a record 155051. The record 155051 indicates that a value of the condition information 155001 is "Maximum character length" and the screen element 155002 is "Taro Tanaka".

Specifically, the record 155051 indicates test scenario condition that a maximum character length will be searched for in the columns of a database corresponding to the character string "Taro Tanaka" for the variable character string 141001 "Taro Tanaka" displayed at a display 1410 to be illustrated in FIG. 10 later on.

FIG. 9 is a diagram illustrating an example of the condition correspondence candidate record group information 156. A table 1560 of the condition correspondence candidate record group information 156 has, as columns, a candidate number 156001, a screen element 156002, condition information 156003, a corresponding record 156004, a corresponding column 156005, and a corresponding value 156006. The table 1560 also has a record 156051. Each of the information will be described later on with reference to FIG. 14.

FIG. 10 is a diagram illustrating an example of the display 1410 of the output device 14. The example illustrated in FIG. 10 is a purchase history, and displayed information corresponds to the elements of the screen information 102 illustrated in FIG. 3. A character string 141001 corresponds to a character string 102000, and character strings 141002 to 141041 respectively correspond to character strings 102001 to 102061. Moreover, character strings 141010 to 141012 and character strings 141020 to 141022 form a table.

The table forms one row of character strings 141010 to 141012 by the tags 102022, 102024, and 102026 illustrated in FIG. 3, and forms one row of character strings 141020 to 141022 by the tags 102032, 102034 and 102036. Then for example, the character string 141010 and the character string 141020 form one row. Note that a display illustrated in FIG. 10 is an example of "Transaction".

FIG. 11 is a diagram illustrating an example of a display 1420 of the output device 14. The example in FIG. 11 illustrates a list of candidates and values satisfying condition. A table 14200 is a display of information of the table 1540 of the candidate record group information 154 illustrated in FIG. 7. Lines 142001 to 142003 of the table 14200 are displays of information of the screen element 154002, the corresponding record 154003, and the corresponding column 154004 of the table 1540 illustrated in FIG. 7, and rows 142051 to 142065 are displays of information of records 154051 to 154094 of the table 1540 illustrated in FIG. 7.

Moreover, a value 142081, a value 142082, and a value 142083 of the values satisfying condition illustrated in FIG. 11 are respectively a value of the screen element 156002, a value of the condition information 156003, and a value of the corresponding value 156006 of the table 1560 of the condition correspondence candidate record group information 156 illustrated in FIG. 9.

Hereinafter, a flow of processing performed by each of the various units will be described. First, the flow of the processing performed by the screen graph information generation processing unit 171 will be described in detail with reference to a flowchart of FIG. 12, the screen information 102 of FIG. 3, and the screen graph information 152 of FIG. 5. Upon start of the processing, the screen graph information generation processing unit 171 reads, from the input device 13, screen type information specifying whether the screen is "Master" or "Transaction" (step 17100). Note that the screen type information is omitted from the illustration.

The screen graph information generation processing unit 171 reads in the screen information 102 (step 17101), takes out one of the elements included in the read screen information 102 (step 17110), and adds indicating information a type of the element and provides the information as a node in the screen graph information 152 (step 17111).

For the information indicating the added type of the element, for example, in case of a character string of at least N-number (where N is a preset integer number) of characters including only alphabets and numerical values, the type is "ID type". In case of a character string of at least L-number of characters (where L is a preset integer number), in which case the type is not the "ID type", the type is "Long character string". In case of a character string of no greater than M-number of characters (where M is a preset integer number less than L), the type is "Short character string", and in case of a character string where the type is neither "Long character string" nor "Short character string", the type is "General character string".

Moreover, the type is "Date and time" in case of data and time, the type is "Long numerical value" in case of a numerical value of at least J-number of digits (where J is a preset integer number), the type is "Short numerical value" in case of a numerical value of no greater than K-number of digits (where K is a preset integer number less than J), and the type is "Numerical value" in case of a numerical value whose kind is neither "Short numerical value" nor "Long numerical value".

The information indicating the added type of the element is not limited to one in number, and an attribute (class) in the elements of the information 1020 of the screen information 102 is added in the example of FIG. 5. For example, the node 152022 corresponding to the tag 102032 illustrated in FIG. 3 is "Telescope A, general character string, product".

The screen graph information generation processing unit 171 determines whether or not there is any unprocessed element in the screen information 102 (step 17112), and returns to step 17110 if there is any unprocessed element and proceeds to step 17120 if there is no unprocessed element. Then a combination of the two elements of the screen information 102 read in step 17101 is obtained (step 17120), and relation between the obtained elements is classified and provided as an edge of the screen graph information 152 (step 17121).

In the example of FIG. 5, "Hierarchy" is defined if the tag is nested, "Same row" is defined if the elements are in the same row on the table instructed by the tag, and "Same line" is defined if the elements are in the same line on the table instructed by the tag. The table includes the character strings 141010 to 1241012 and the character strings 141020 to 141022 in the example of FIG. 10.

Moreover, in the example of FIG. 5, since the tags 102022 and 102024 are in the same row of the table, an edge 152113 indicating relation "Same row" is defined between the node 152012 "Fan A, general character string, product" and the node 152013 "10000, numerical value, price". The relation is not limited to those described above, and may be relation based on coordinates on the screen, relation based on screen transition, or order of appearance of the screen elements.

The screen graph information generation processing unit 171 determines whether or not there is any unprocessed element in the screen information 102 (step 17122), and returns to step 17120 if there is any unprocessed element and proceeds to step 17130 if there is no unprocessed element. That is, the graph propagation processing unit 172 is invoked (step 17130).

Figure 13:
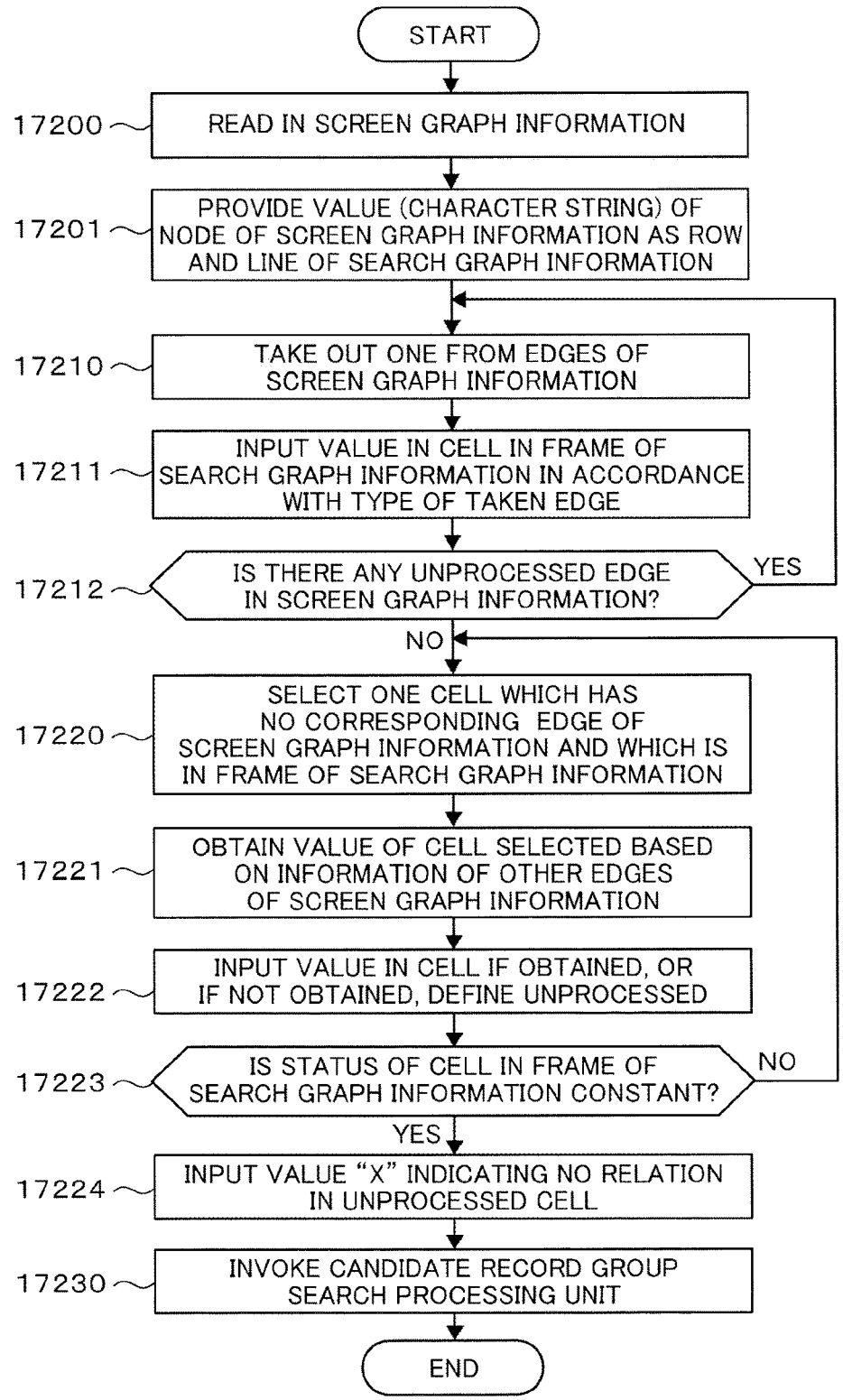
FIG. 13 is a flowchart illustrating an example of processing performed by a graph propagation processing unit

A flow of the processing performed by the graph propagation processing unit 172 will be described in detail with reference to a flowchart of FIG. 13, the screen graph information 152 of FIG. 5, and the search graph information 153 of FIG. 6. Upon start of the processing, the graph propagation processing unit 172 reads in the screen graph information 152 (step 17200), and provides values (character strings) of the nodes included in the screen graph information 152 as rows 153051 to 153063 and lines 153001 to 153013 of the search graph information 153 (step 17201).

The graph transmission processing unit 172 takes out one edge from the edges included in the screen graph information 152 (step 17210) and inputs a value thereof in the cell in the frame 153070 in accordance with a type thereof (step 17211). For example, if the type of the edge taken out is "Hierarchy", "R" indicating that the values (character strings) of the two nodes forming the "Hierarchy" can be in the same record and provided as the value of the cell.

Moreover, if the type of the edge taken out is "Same row" or "Same line", the determination is made with reference to the type of the edge. Specifically, if the classes differ or the types of the nodes (types of the elements) differ without any class specification, "R" indicating that the values (character strings) of the nodes can be in the same record is provided as the value of the cell. On the contrary, if the classes are the same or the types of the nodes (types of the elements) are the same in at least a given ratio, "C" indicating that the values are in the same column of the table is provided as the value of the cell.

The graph propagation processing unit 172 determines whether or not there is any unprocessed edge in the screen graph information 152 (step 17212), and returns to step 17210 if there is any unprocessed edge and proceeds to step 17220 if there is no unprocessed edge. Here, if the graph propagation processing unit 172 proceeds to step 17220, there is no unprocessed edge, and thus there is no corresponding edge in the cell of the frame 153070 in which no value is inputted at time of the proceeding to step 17220.

Thus, the graph propagation processing unit 172 selects one cell which is located in the frame 153070 and which has no corresponding edge in the screen graph information 152 (step 17220), and obtains a value of the selected cell based on the information of the other edges (non-corresponding edges) (step 17221). For example, the value of the cell is "C" if the two nodes (elements) have relation "Hierarchy" for the same (single) node (element).

Moreover, if the two nodes have the relation "Hierarchy" for the same node and have the different classes, the value of the cell is "R". For example, each node in the group 152201 illustrated in FIG. 5 has relation "Hierarchy" with the same single node 152003, and thus the two nodes including the node 152031 "500, numerical values, charge" and the node 152033 "Bank transfer, general character string, none" have relation "Hierarchy" of the edge 152103 for the node 152003 "BUY0001, ID type, none", but have different classes. Therefore, the value is "R" as is the case with the cell 153074 illustrated in FIG. 6.

If both the values "C" and "R" cannot be identified, another cell is once processed. Thus, in step 17221, if the value "C" or "R" is identified, the identified value is inputted into the cell, and if the value is not identified, the cell is left unprocessed and the processing in and after step 17222 is repeated in attempt to perform the specification.

The graph propagation processing unit 172 determines whether or not statuses of the cells in the frame 153070 of the search graph information 153 are constant (step 17223). More specifically, if the cells in the frame 153070 are filled with the values "C" or "R", the values in the cells do not change, thus leading to determination that the statuses of the cells are constant. Moreover, even under the presence of any unprocessed cell in the frame 153070, no value may not be inputted into the unprocessed cell in the repeating of the processing in steps 17220 to 17223, in which case the unprocessed state does not change through the repeating of the processing, thus leading to determination that the status of the cell is constant.

The graph propagation processing unit 172 returns to step 17220 upon the determination that the status of the cell is not constant, and proceeds to step 17224 upon determination that the status of the cell is constant. Here, if any unprocessed cell remains, "x" is inputted as a value indicating no relation to the unprocessed cell (step 17224), and the candidate record group search processing unit 173 is invoked (step 17230).

Figure 14:
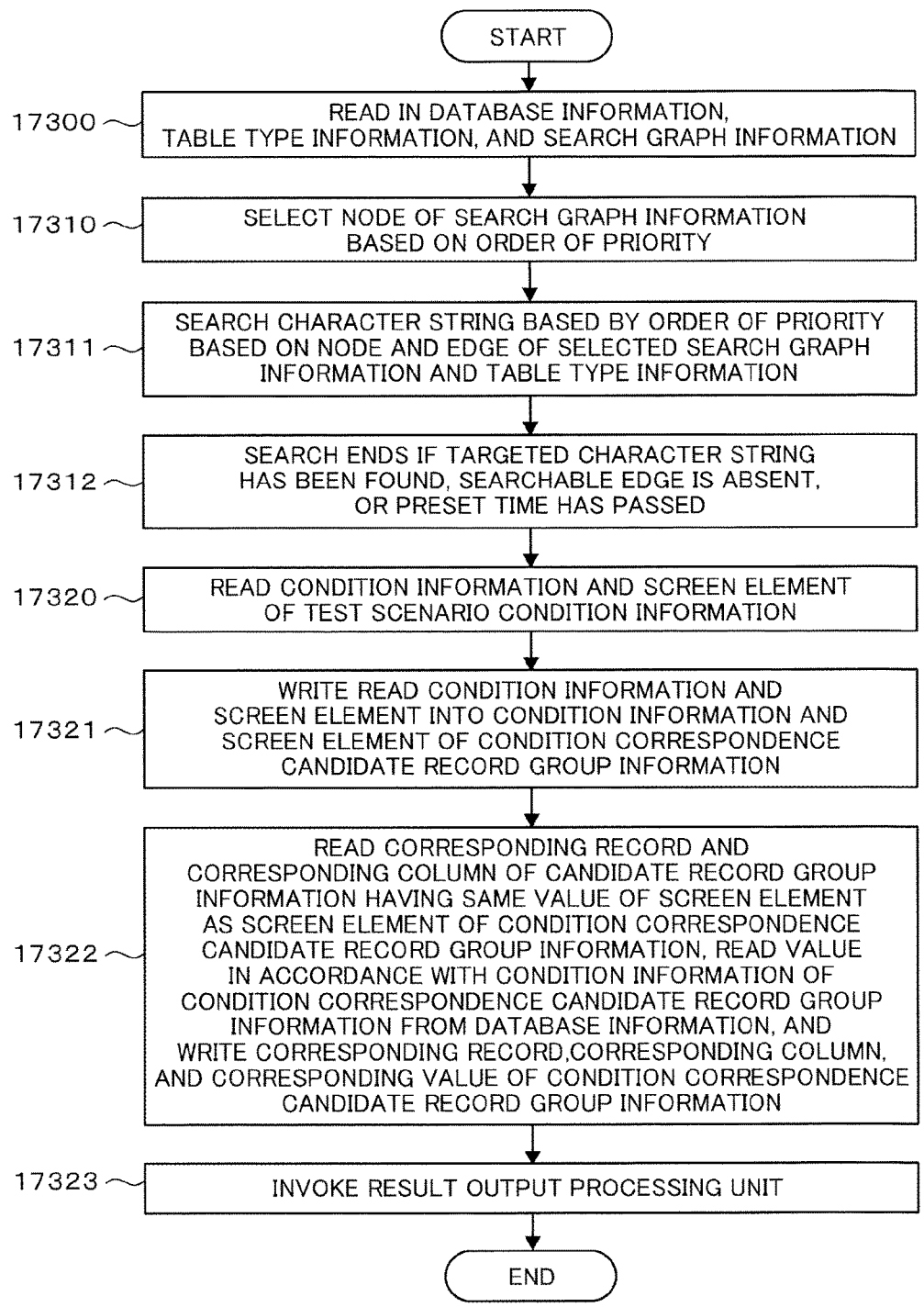
FIG. 14 is a flowchart illustrating an example of processing performed by a candidate record group search processing unit.

A flow of processing performed by the candidate record group search processing unit 173 will be described in detail with reference to a flowchart of FIG. 14, the database information 101 illustrated in FIG. 2, the table type information 151 illustrated in FIG. 4, the search graph information 153 illustrated in FIG. 6 (the screen graph information 152 illustrated in FIG. 5), the test scenario condition information 155 illustrated in FIG. 8, and the condition correspondence candidate record group information 156 illustrated in FIG. 9.

The candidate record group search processing unit 173 reads in the database information 101, the table type information 151, and the search graph information 153 (step 17300), selects the node of the search graph information 153 of FIG. 6 based on order of priority (step 17310), and searches for the node and the edge (cell) of the search graph information 153 of FIG. 6 and the character string by order of priority based on the table type information 151 (step 17311).

For example, the node is selected in accordance with the order of priority to be described next, and the search is executed with priority put on a depth of hierarchy. For the first node selection, the type of the node is first referenced, the long character string/long numerical value has priority over the date and the ID type, and the date and the ID type have priority over the other types. Next, if there are a plurality of dates and ID types, the node having a key and a unique character string has priority. Finally, the node at which the screen type information inputted in step 17100 is equal to the type of the table illustrated in the table type information 151 has priority.

If there are a plurality of types of searchable edge in the second node selection beyond, "C" of the edge has priority over "R". Next, if there are a plurality of edges of the same type, with reference to the types of the nodes at tips of the edges, the Long character string/Long numerical value have priority over the data and the ID type, and the date and the ID type have priority over the other types. Next, if there are a plurality of dates and ID types, the node having a key and a unique character string has priority. Finally, if two or more same character strings are found, the character string having a larger number of characters which is found along the edge has priority. The same column is searched for if the edge is "C" while the same record is searched for if the edge is "R".

For example, if the targeted character string illustrated in FIG. 6 has been found, if the searchable edge is absent, or if preset given time or more has passed, the candidate record group search processing unit 173 ends the search (step 17312).

Describing steps 17310 to 17312 in more detail, the candidate record group search processing unit 173 first searches the database information 101 for the character string which is included in the nodes in the screen graph information 152 and which corresponds to the node 152034 "Please be careful about quantity different from that of last order" which is a long character string, and finds NOTE101007 of the record 101051 on the table 1010 (BUY).

Next, it is found based on the edge "R" that the value included in the record 101051 is "1" (PAYM101002), the value is "A101" (ACC101033), the value is "2016/6/1" (LIMIT101004), the value is "500" (CHARGE101005), and the value is "12500" (SUMMARY101006).

Next, the BUY_ID101001 is a primary key, and thus the other tables which refer to BUY_101001 as a foreign key is searched for, and it is found that the value of the record 1051 of the table 1011 (ITEM) is "10000" (PRICE101104) and the value is "1" (NUM101105), and it is found that the value of the record 101153 is "2000" (PRICE101104) and the value is "2" (NUM101105).

Next, along the PAYM101002 as a foreign key of the record 101051 of the table 1010 (BUY), it is found that the value of the record 101451 of the table 1014 (PAY) is "Bank transfer" (PAY_NAME101402). It is also found along the ACC101002 as the foreign key of the record 101051 that the value of the record 101351 of the table 1013 (ACC) is "Taro Tanaka" (AC_NAME101302)

Further, it is found along PRD_ID101103 as the foreign key of the record 101151 of the table 1011 (ITEM) that the value of the record 101251 of the table 1012 (PRD) is "Fan A" (PRD_NAME101202). Moreover, it is found along the PRD_ID101103 as the foreign key of the record 101153 that the value of the record 101252 of the table 1012 (PRD) is "Telescope A" (PRD_NAME101202).

As a result, the character strings illustrated in FIG. 6 can be found. Here, the values (character strings) found here may be provided as the screen element 154002 of the record group information 154. Moreover, the records and the columns used upon the finding may be respectively provided as the corresponding record 154003 and the corresponding column 154004.

The candidate record group search processing unit 173 reads the condition information 155001 and the screen element 155002 of the test scenario condition information 155 (step 17320), and writes the value of the read condition information 155001 and the value of the screen element 155002 into condition information 156003 and a screen element 156002, respectively, of the condition correspondence candidate record group information 156 (step 17321).

The candidate record group search processing unit 173 reads the value of the corresponding record 154003 and the value of the corresponding column 154004 included in the record 154092 of the candidate record group information 154 in which the value of the screen element 154002 of the candidate record group information 154 is equal to the value of the screen element 156002, and writes the read values respectively into a corresponding record 156004 and a corresponding column 156005 of the condition correspondence candidate record group information 156.

Moreover, the value in accordance with the condition information 156003 is read from the database information 101, and the read value is written into a corresponding value 156006 (step 17322). In the example of FIG. 9, the corresponding column 156005 is "ACC.AC_NAME", and thus "John A. B. Smith" corresponding to "Maximum character length" of the condition information 156003 in the AC_NAME101302 of the table 1013 (ACC) is read from the database information and written into the corresponding value 156006. Then the result output processing unit 174 is invoked (step 17323).

Finally, a flow of the processing performed by the result output processing unit 174 will be described in detail with reference to a flowchart of FIG. 15, the candidate record group information 154 of FIG. 7, the condition correspondence candidate record group information 156 of FIG. 9, and the display 1420 of FIG. 11.

The result output processing unit 174 displays the candidate record group information 154 as the table 14200 on the display 1420 (step 17401). Next, respective values of the screen element 156002, the condition information 156003, and the corresponding value 156006 of the condition correspondence candidate record group information 156 are displayed as values 142081 to 142083 on the display 1420 (step 17402). FIG. 11 may further display part of the candidate record group information 154 omitted from the illustration.

As described above, graph information used for the search can be creased based on the value of the element displayed on the screen, the type of the element, and inter-element relation, and a candidate database record as a basis of the value of the element displayed on the screen can be searched for, and the candidate can be displayed on the output device. Further, condition of a test scenario to be created can be accepted, and a database record satisfying the condition can be displayed on the screen.

The description below refers to flowcharts of the screen graph information generation processing unit 171, the graph propagation processing unit 172, the candidate record group search processing unit 173, and the result output processing unit 174 respectively of FIGS. 12 to 15, but each may be a flowchart of a program of the CPU 11. Moreover, the computer 1 has been described as a single computer, but the program may be executed by two or more computers.

Moreover, each of the configuration, the functions, the processing units, the processing means, etc. described above may be realized partially or entirely by using hardware through, for example, designing with an integrated circuit. The storage device 15 may be a recording device such as a hard disk drive (HDD) or a solid state drive (SSD) or a recording medium such as a magnetic tape, a flash memory, or a digital versatile disc (DVD).

Moreover, the pieces of information respectively stored in the memory 12 and the storage device 15 are not limited to the arrangement illustrated in FIG. 1, but may be transferred between the memory 12 and the storage device 15. Then the programs and data omitted from the illustration in FIG. 1 may be stored in the memory 12 and the storage device 15.

Moreover, connection of the various components (information exchange) assumed to be necessary for the description are illustrated, which therefore does not necessarily indicate all the connections. It can actually be assumed that almost all the configuration are connected to each other.

Finally, the present invention is not limited to the embodiment described above, and various modified examples are also included therein. For example, the aforementioned embodiment is described in detail for better understanding of the present invention, and thus the invention is not necessarily limited to all the configurations described. Moreover, another configuration may be provided in accordance with, for example, computer environment of the test input information search device for the purpose of obtaining information required for the processing described above.

What is claimed is:

1. A method that improves functional testing of a computer system that accesses a database, the method comprising: retrieving information from the database including a plurality of elements configured with a first structure; retrieving screen information including the plurality of elements configured with a second structure and displayed; identifying, from the second structure, a relation between the elements in the plurality of elements included in the screen information, determining a candidate for test inputting from the information from the database based on the relation identified between the elements; and testing the database by inputting the candidate into the computer system and evaluating a response in the computer system caused by the inputting;

wherein the second structure includes a display positional relation between the elements in the plurality of elements included in the screen information and attributes of the elements, and the candidate is further determined based on the attributes of the elements in addition to the relation identified between the elements.

2. The method according to claim 1, further comprising: identifying a type of each of the plurality of elements included in the screen information and generating a plurality of nodes each combining together the element, the attribute of the element, and the type of the element, and identifying, as the relation between the elements from the second structure, a type of an edge between the generated plurality of nodes.

3. The method according to claim 2, further comprising:
identifying a relation between two nodes as a cell based on the type of the edge identified, relation between attributes of two elements forming the two nodes located at both ends of the edge, and relation between the types of the two elements.

4. The method according to claim 3,
in a case where the type of the edge between a first node and a second node in the generated plurality of nodes is not identified from the second structure, identifying the relation between the first node and the second node as the cell based on the type of the edge between a third node and the first node in the generated plurality of nodes and the type of the edge between the third node and the second node.

5. The method according to claim 4, further comprising:
searching for part of the plurality of elements from the information in the database in accordance with order of priority based on the types identified of the elements, and searching for part of the plurality of elements from the information in the database in accordance with order of priority based on the relation identified as the cell.

6. The method according to claim 5, wherein
the first structure includes a plurality of tables each having a plurality of columns,
information of the elements and information of condition are specified, and
a value is searched for which satisfies the specified information of condition of the column including the specified information of the element in the plurality of elements searched from the information in the database.

7. The method according to claim 6, wherein
the database is relational database.

8. An apparatus that improves functional testing of a computer system that accesses a database, the apparatus comprising: a communication interface communicatively coupled to the database: a processor communicatively coupled to the communication interface, wherein the processor: retrieves, using the communication interface, a plurality of elements configured with a first structure from the database, retrieves, using the communication interface, screen information that includes the plurality of elements configured with a second structure and displayed, identifies, from the second structure, relation between the elements in the plurality of elements included in the screen information, determines a candidate for test inputting from the information in the database based on the relation identified between the elements, and test the database by inputting the candidate into the computer system and evaluating a response in the computer system caused by the inputting;
wherein the second structure includes a display positional relation between the elements in the plurality of elements included in the screen information and attributes of the elements, and the candidate is further based on the attributes of the elements in addition to the relation identified between the elements.

9. The apparatus according to claim 8, wherein processor further: identifies a type of each of the plurality of elements included in the screen information, and generates a plurality of nodes each combining together the element, the attribute of the element, and the type of the element, and identifies, from the second structure, a type of edge between the generated plurality of nodes as the relation between the elements.

10. The apparatus according to claim 9, wherein processor further:
identifies relation between two nodes as a cell based on the type identified of the edge and relation between attributes of two elements forming the two nodes at both ends of the edge and relation between the types of the two elements.

11. The apparatus according to claim 10, wherein
in a case where the type of the edge between a first node and a second node in the generated plurality of nodes is not identified from the second structure, the processor identifies the relation between the first node and the second node as the cell based on the type of the edge between a third node and the first node in the generated plurality of nodes and the type of the edge between the third node and the second node.

12. The apparatus according to claim 11, wherein the processor further:
searches for part of the plurality of elements from the screen information in the database in accordance with order of priority based on the identified types of the elements, and searches for part of the plurality of elements from the screen information in the database in accordance with order of priority based on the relation identified as the cell.

13. The apparatus according to claim 12, wherein
the first structure includes a plurality of tables each having a plurality of columns, and
the processor further:
specifies information of the elements and information of condition, and searches for a value satisfying the specified information of condition from the column of the table including the specified information of the element in the plurality of elements searched from the screen information in the database.

* * * * *